United States Patent [19]
Hite

[11] Patent Number: 6,084,382
[45] Date of Patent: Jul. 4, 2000

[54] BATTERY SYSTEMS AND METHODS OF SUPPLYING ELECTRICAL ENERGY

[75] Inventor: Gregory H. Hite, Meridian, Id.

[73] Assignee: Hewlett-Packard Company, Palo Alto, Calif.

[21] Appl. No.: 09/067,340

[22] Filed: Apr. 27, 1998

[51] Int. Cl.[7] .................................................. H02J 7/00
[52] U.S. Cl. ............................................ 320/116; 320/124
[58] Field of Search .................................. 320/116, 124, 320/119, 121, 136

[56] References Cited

U.S. PATENT DOCUMENTS

| | | | |
|---|---|---|---|
| 4,281,278 | 7/1981 | Bilsky et al. | 320/136 |
| 5,652,499 | 7/1997 | Morita et al. | 320/112 |
| 5,886,503 | 3/1999 | McAndrews et al. | 320/121 |

Primary Examiner—Adolf Deneke Berhane
Assistant Examiner—Lawrence Luk

[57] ABSTRACT

The present invention provides battery systems and methods of supplying electrical energy. According to one aspect of the present invention, a battery system includes a terminal adapted to be electrically coupled to a load; a battery including a plurality of working cells electrically coupled with the terminal; a spare cell; and a switching device configured to selectively electrically couple the spare cell with the terminal and arrange at least some of the working cells and the spare cell to provide electrical energy to the terminal.

15 Claims, 4 Drawing Sheets

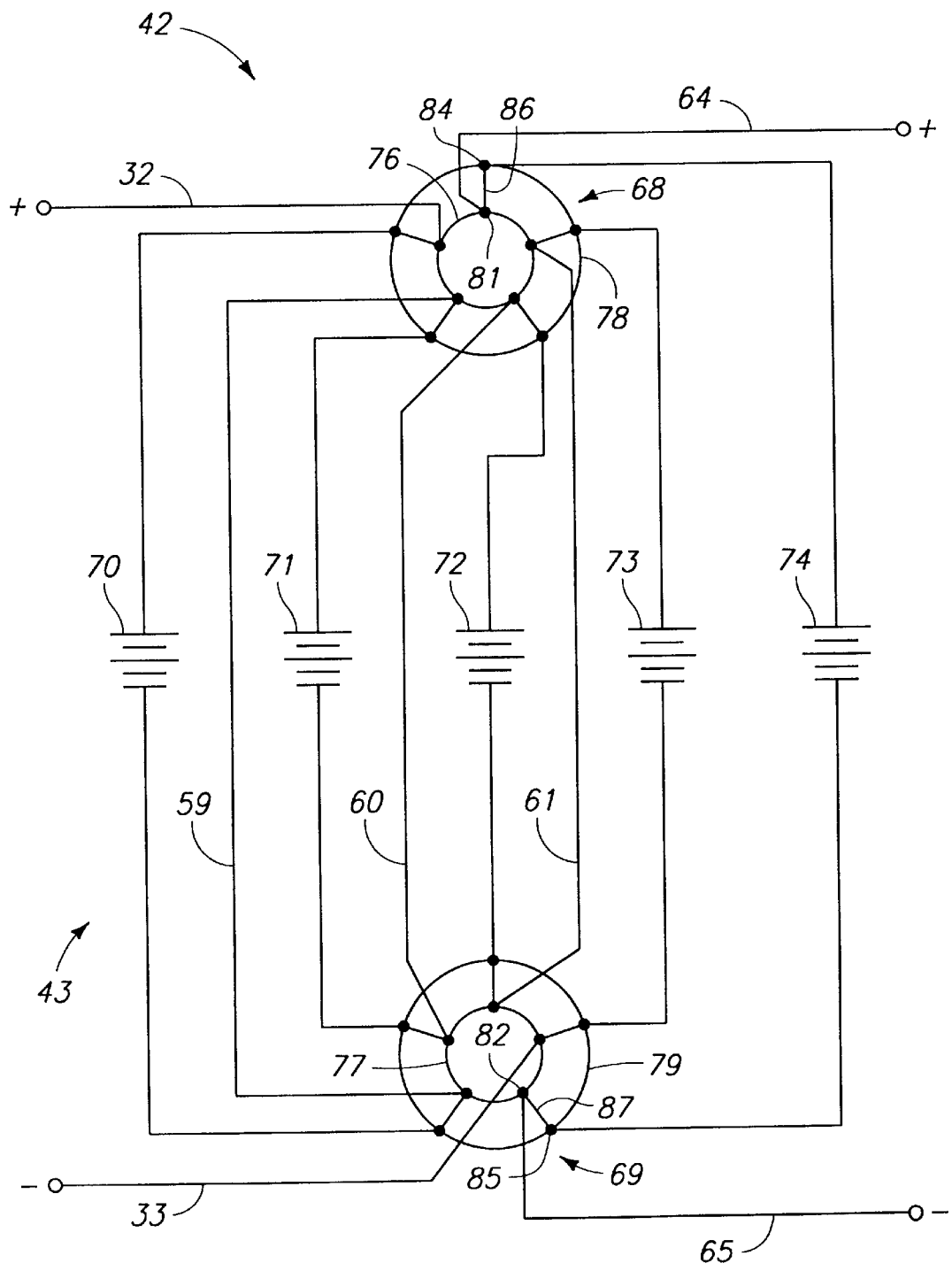

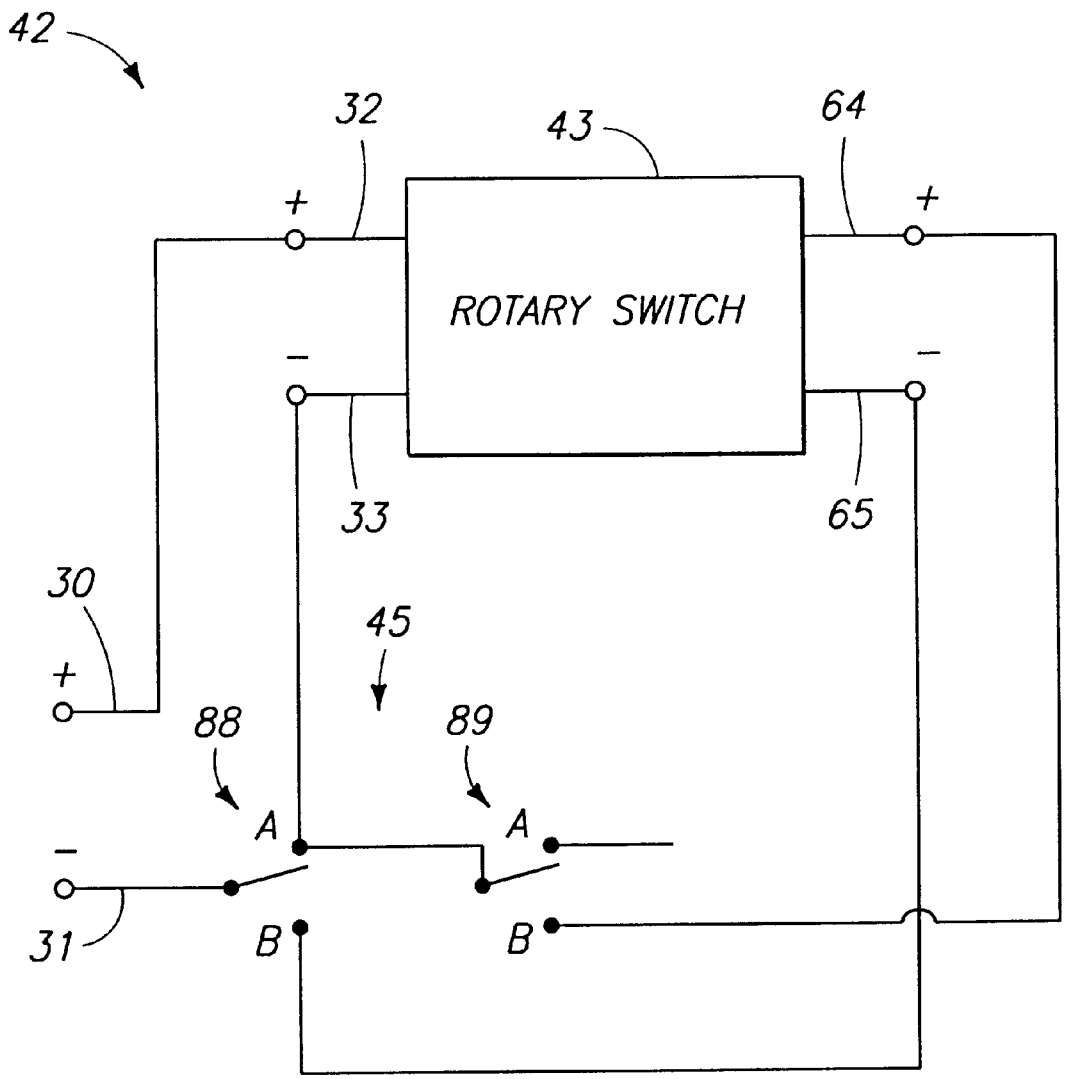

BATTERY SYSTEMS AND METHODS OF SUPPLYING ELECTRICAL ENERGY

FIELD OF THE INVENTION

The present invention relates to battery systems and methods of supplying electrical energy.

BACKGROUND OF THE INVENTION

Back-up or reserve power systems are utilized in a plurality of applications to assure proper operation of an associated electronic device. An exemplary back-up power system comprises an uninterruptible power system (UPS). Uninterruptible power systems are typically configured to provide or assure application of continuous power to an electronic device.

For example, some computer applications utilize uninterruptible power supplies in order to prevent the loss of data, or avoid costly downtime. Another exemplary application includes utilization of an uninterruptible power supply in a hospital where continuous power is desired.

Some system configurations include auxiliary generators for use if a main power supply experiences a disturbance such as a brownout, brown power disturbance or complete loss of power. However, such auxiliary generators usually require a specified period of time before they are able to generate sufficient power for online application to the associated load. Although these power-up time periods may be relatively short in duration (e.g., less than one minute), the possibility of loss of data or failure of equipment exists.

Back-up battery systems are often utilized in such generator applications to provide instantaneous power at the time of the loss or disturbance of power from the main power supply. The back-up batteries are typically designed with an appropriate capacity to supply power until the auxiliary generators are operable to generate sufficient power and brought on line.

Other battery back-up installations are configured for possible periodic applications. One example includes configurations for starting emergency motor vehicles such as ambulances. These battery back-up installations typically comprise a dual battery configuration. Should one battery fail, be insufficiently charged, or become otherwise inoperative, the second battery is utilized to supply power as needed to the load. In such a configuration, the dual batteries are usually individually sized large enough to supply enough power to the load. These systems can be referred to as dual battery back-up systems or one hundred percent redundant battery back-up systems.

The conventional dual battery back-up systems include associated drawbacks of having approximately twice the cost in batteries, twice the physical volume and utilizing a redundant charging and fail-over controller. In addition, the use of two batteries consumes twice the amount of materials which are often toxic. Further, special safety and recycling processes of such toxic materials are often utilized to meet environmental standards providing additional drawbacks.

Referring to FIG. 1, a conventional redundant battery back-up system 10 is illustrated. The depicted redundant battery back-up system 10 comprises a fail-over controller 11, back-up switch 13, working battery 15, and redundant battery 17.

System 10 is configured to provide back-up power to a load 12, such as a computer or computer database. During normal operation, power supply 14 is coupled via switch 16 with load 12, and supplies operational power to load 12. An exemplary power supply 14 comprises a utility configured to supply 60 Hz AC power.

During periods of brownout or failure of power supply 14, switch 16 is configured to couple battery back-up system 10 with load 12. Redundant battery back-up system 10 can be configured to provide power until adequate power from power supply 14 is available.

During normal operating periods when battery system 10 is utilized to apply power via switch 16 to load 12, working battery 15 is coupled via back-up switch 13 with load 12. If working battery 15 is not operational when failure of power supply 14 occurs or working battery 15 is subsequently depleted during a back-up operation, fail-over controller 11 configures back-up switch 13 to couple redundant battery 17 with load 12 providing redundant operation.

In typical conventional systems, working battery 15 and redundant battery 17 comprise dual one hundred percent redundant batteries. Although redundant features of operation are provided utilizing this described conventional design, numerous drawbacks exist with such a configuration as discussed above.

There exists a need to provide battery systems and methodologies which provide improvements over the prior art configurations.

DESCRIPTION OF THE DRAWINGS

Preferred embodiments of the invention are described below with reference to the following accompanying drawings.

FIG. 6 is a schematic diagram of an exemplary switching device utilized within a back-up system of the present invention.

FIG. 7 is a schematic diagram of another switching device configured to serially couple a spare cell with a working set of cells.

DETAILED DESCRIPTION OF THE INVENTION

Figure 1:
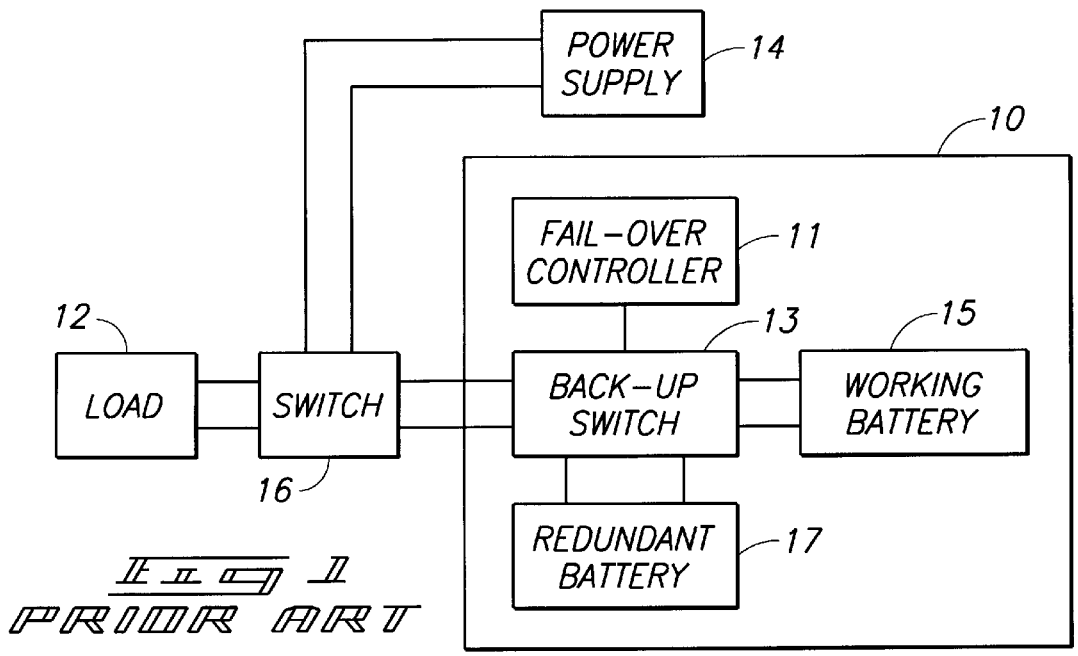
FIG. 1 is a functional block diagram of a conventional redundant battery back-up system.

This disclosure of the invention is submitted in furtherance of the constitutional purposes of the U.S. Patent Laws "to promote the progress of science and useful arts" (Article 1, Section 8).

Embodiments of the present invention disclosed herein are described with reference to battery back-up system applications. Such configurations can be implemented independent of scale and exemplary arrangements include tiny cell applications and large power applications. Preferred configurations of exemplary battery systems described herein comprise redundant battery back-up systems. Although the described embodiments disclose back-up and redundant battery back-up systems, the present invention is not limited to back-up or redundant battery back-up applications or configurations.

As utilized herein, cell refers generally to a self-contained chemistry unit which may be used singularly. Cell can also refer to a cell pack including plural cells coupled in series or parallel to achieve a desired voltage and current capability. Cell packs can also be configured to provide a desired intermediate voltage and current for use in a battery or battery pack.

Battery generally refers to one or more cells, or cell packs, which provide a desired working voltage and current. A spare cell or spare cell pack refers in exemplary embodiments to a cell or set of cells installed into a redundant battery system. The spare cell or spare cell pack is typically not used during charge and discharge cycles of the battery of a redundant battery system. A spare cell is typically tested and maintained in a fully charged condition for use to maintain a desired working voltage or current. Spare cells can also be referred to as redundant cells.

Batteries can comprise a working set of cells. The working set of cells can form a minimum sized battery to meet the demands of an attached load. The working set of cells is preferably supplemented with one or more spare cells or spare cell packs in accordance with the present invention. The spare cell or cells can be removed from a spare condition and exchanged with one or more working cells. Alternatively, the spare cell or cells may be placed in series with the working cells.

Replaced or exchanged working cells preferably become spare cells. While in a spare condition, the cells can be charged, discharged, or analyzed for total capacity. In the preferred embodiment, any given working cell can be exchanged (one or more at a time) enabling spare cells to form part of the working set of cells.

According to one aspect of the invention, a battery system comprises: a terminal adapted to be electrically coupled to a load; a battery including a plurality of working cells electrically coupled with the terminal; a spare cell; and a switching device configured to selectively electrically couple the spare cell with the terminal and arrange at least some of the working cells and the spare cell to provide electrical energy to the terminal.

A second aspect of the invention provides a method of supplying electrical energy comprising: providing a plurality of working cells and a spare cell; electrically coupling a plurality of working cells with a terminal; supplying electrical energy to the terminal using the working cells; selectively electrically coupling the spare cell with the terminal; and supplying electrical energy to the terminal using at least some of the working cells and the spare cell following the coupling.

Another aspect of the present invention provides a method of supplying electrical energy to a load using a redundant battery back-up system comprising: providing a plurality of working cells and a spare cell; providing a plurality of terminals having opposite electrical polarity; electrically coupling a plurality of working cells in series intermediate the terminals; selectively supplying electrical energy to at least one of the terminals using the working cells; first monitoring an electrical condition of individual ones of the working cells; selectively exchanging one of the working cells with the spare cell responsive to the first monitoring; supplying electrical energy to at least one of the terminals using the spare cell following the exchanging; second monitoring a collective electrical condition of the working cells; selectively electrically coupling the spare cell in series with the terminals and the working cells responsive to the second monitoring; and supplying electrical energy to at least one of the terminals using the spare cell and the working cells following the coupling.

Figure 2:
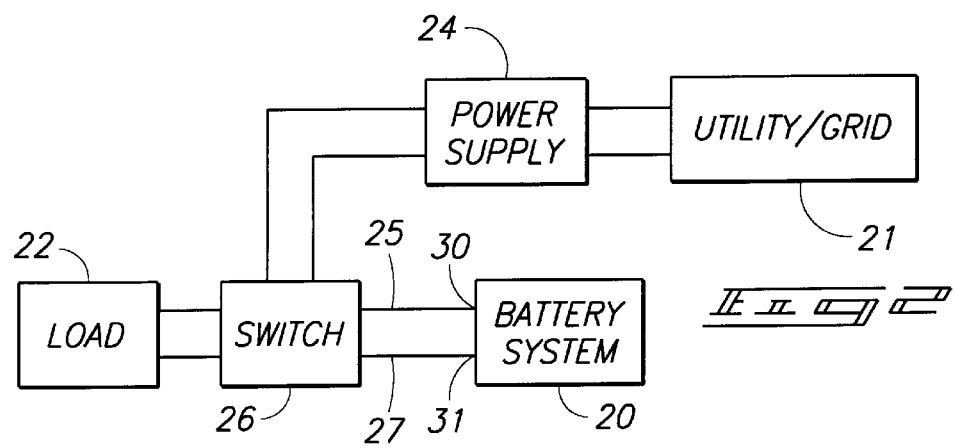
FIG. 2 is a functional block diagram of an embodiment of a battery system according to the present invention provided in a DC application.

Referring to FIG. 2, one embodiment of a battery system 20 of the present invention is depicted in an exemplary back-up application. The depicted battery system 20 is provided in a DC application. FIG. 2 also depicts a utility/grid 21, load 22, power supply 24, and switch 26. Battery system 20 is configured to provide back-up electrical power or energy to load 22. In the depicted embodiment, switch 26 is configured to selectively couple one of battery system 20 and power supply 24 with load 22. Power supply 24 is configured to receive electrical power from utility 21. Utility 21 is configured in a typical arrangement to provide AC power at 60 Hz. Power supply 24 is configured to output DC power in the depicted embodiment. The DC power is typically at 12 Volts or 48 Volts.

In the described application, battery system 20 is operational to provide electrical power or energy to load 22 during power disturbances or failures within utility 21 and/or power supply 24. Other configurations of battery system 20 are configured to provide power for other applications. Switch 26 is operable to couple battery system 20 with load 22 responsive to the presence of a disturbance or failure within utility 21 and/or power supply 24. Switch 26 is preferably configured to recouple utility 21 and power supply 24 with load 22 following restoration of suitable or useable power within utility 21 and power supply 24.

Exemplary plural connections are provided intermediate battery system 20, utility 21, load 22, power supply 24, and switch 26 in FIG. 2. The illustrated connections represent connections of opposite polarity (i.e., positive and negative) between corresponding components. For example, connections 25, 27 are configured to connect battery system 20 and switch 26. In the described embodiment, connection 25 illustrates a positive connection intermediate battery system 20 and switch 26. Connection 27 represents a negative connection intermediate battery system 20 and switch 26.

Battery system 20 additionally includes plural terminals 30, 31 which are adapted for electrical coupling with respective connections 25, 27, switch 26 and load 22. In particular, terminal 30 comprises an anodic terminal configured for coupling with positive connection 25. Terminal 31 comprises a cathodic terminal configured for coupling with negative connection 27.

Figure 3:
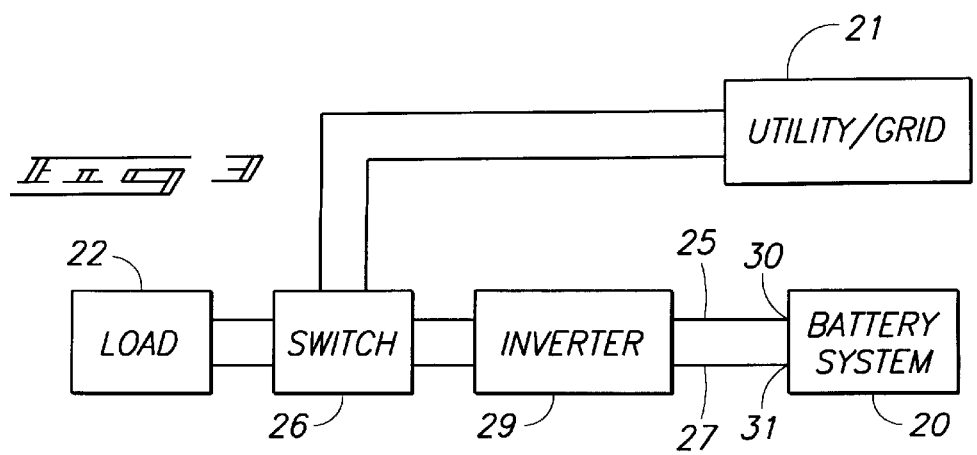
FIG. 3 is a functional block diagram of an embodiment of a battery system according to the present invention provided in an AC application.

Referring to FIG. 3, battery system 20 of the present invention is depicted in another exemplary back-up application. The depicted battery system 20 is provided in an AC application. Utility 21 is configured to provide 60 Hz AC power to switch 26. An inverter 29 is provided intermediate battery system 20 and switch 26. Inverter 29 is configured to convert DC power from battery system 20 into AC power which can be applied to load 22. Switch 26 is configured to couple inverter 29 with load 22 responsive to a power disturbance within utility 21.

Figure 4:
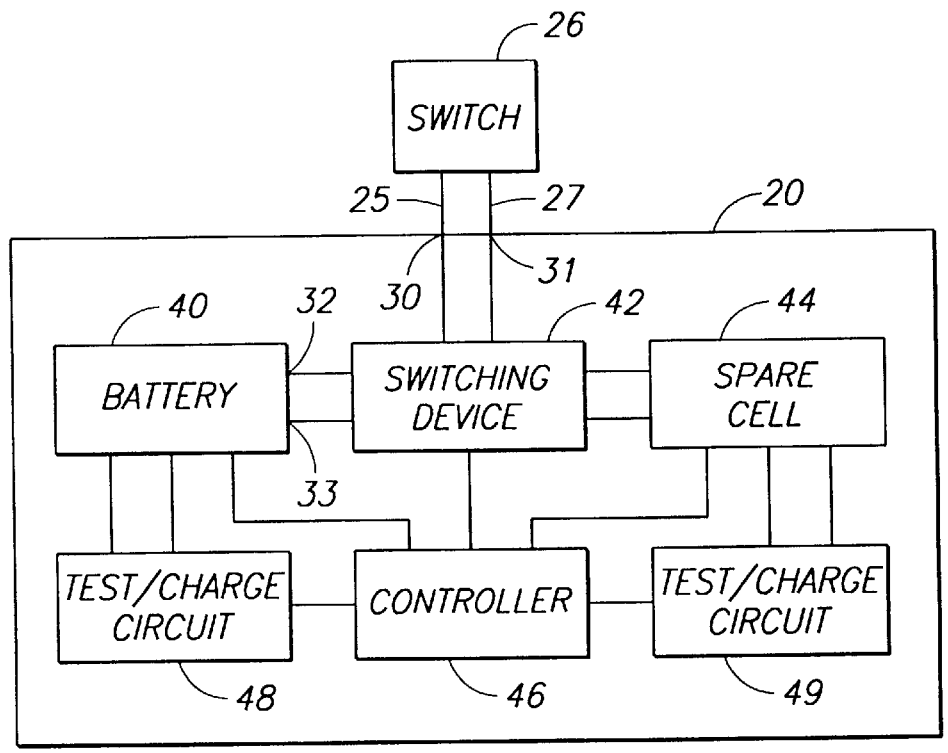
FIG. 4 is a functional block diagram illustrating internal components of an exemplary battery system of the present invention.

Referring to FIG. 4, internal components of one embodiment of battery system 20 are illustrated. The depicted battery system 20 includes a battery 40, switching device 42, spare cell 44, controller 46, and plural test/charge circuits 48, 49.

Battery 40 includes plural terminals 32, 33 individually adapted for electrical coupling with switch 26 via switching device 42. In the depicted embodiment, terminal 32 comprises an anodic terminal configured to couple with anodic terminal 30 of system 20 and connection 25. Terminal 33 comprises a cathodic terminal configured to couple with cathodic terminal 31 of system 20 and connection 27.

Battery 40 comprises a cell pack in one embodiment and includes a plurality of working cells (not shown in FIG. 4) electrically coupled with terminals 32, 33. An exemplary battery 40 comprises a lead-acid battery. Although simplified in FIG. 4, switching device 42 is configured to selectively electrically couple spare cell 44 with terminals 30–33. In addition, switching device 42 is configured to arrange at least some of the working cells and spare cell 44 to provide electrical energy to terminals 30–33. Switching device 42 is configured in one embodiment to replace or exchange at least one of the working cells with spare cell 44. In addition, switching device 42 is preferably configured to couple spare cell 44 intermediate terminals 30, 31 or in series with terminals 30, 31 and the working cells.

Spare cell 44 has a voltage potential less than a voltage potential of battery 40 in the described embodiment. In one embodiment, spare cell 44 and individual working cells of battery 40 have a common voltage potential.

Controller 46 is coupled with battery 40, spare cell 44 and test/charge circuits 48, 49. A suitable controller 46 can comprise a microcontroller and firmware in one exemplary embodiment.

In a preferred embodiment, controller 46 is configured to monitor one or more of the working cells of battery 40. Such monitoring can comprise monitoring the electrical condition (e.g., charge, voltage) of the working cells using test/charge circuit 48. Controller 46 is configured to operate switching device 42 and circuits 48, 49 in the described embodiment responsive to monitoring of the working cells of battery 40 and spare cell 44.

Test/charge circuit 48 is configured to at least one of test, charge and discharge working cells of battery 40 via plural connections intermediate battery 40 and test/charge circuit 48. In one embodiment, test/charge circuit 48 is configured to charge the working cells of battery 40 in series. Controller 46 is ideally configured to operate switching device 42 and circuit 48 responsive to the monitoring of the working cells of battery 40. In the depicted embodiment, switching device 42 and circuit 48 are operated responsive to control signals from controller 46.

Controller 46 is preferably configured to monitor the electrical condition of spare cell 44. Such monitoring can comprise monitoring the electrical condition of spare cell 44 using test/charge circuit 49. Test/charge circuit 49 is also configured to at least one of test, charge and discharge spare cell 44 of battery system 20 using plural connections intermediate spare cell 44 and test/charge circuit 49.

Switching device 42 is configured in the described embodiment to electrically isolate spare cell 44 from terminals 30–33 during testing and monitoring of spare cell 44. Battery system 20 is ideally configured to provide charging, testing and discharging of spare cell 44 using test/charge circuit 49 while enabling supply of electrical energy to terminals 30–33 using the working cells of battery 40. A float charge can be utilized in one embodiment to charge the working cells of battery 40 and spare cell 44. In particular, exemplary test/charge circuits 48, 49 include individual float chargers.

Figure 5:
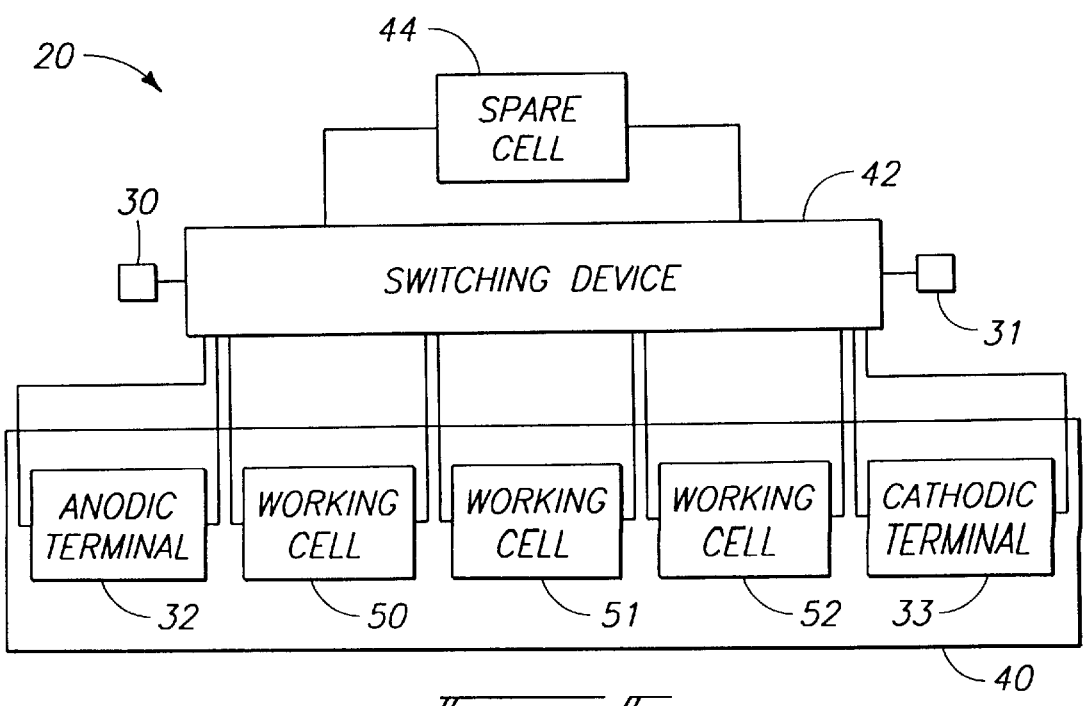
FIG. 5 is a functional block diagram illustrating connections of a plurality of cells.

Referring to FIG. 5, one embodiment of battery 40 is illustrated. Battery 40 is shown coupled via an illustrative switching device 42 with spare cell 44. The illustrated battery 40 includes a working set of cells 50, 51, 52. The number of cells (working and spare) depicted in FIG. 5 is exemplary. System 20 can include additional spare cells and more or less working cells.

In the described embodiment, switching device 42 is configured to selectively electrically couple working cells 50–52 in series. Working cells 50–52 are operable to provide electrical power to load 22 via terminals 30–33. Spare cell 44 is typically electrically insulated from terminals 30–33 and working cells 50–52 during normal application of electrical power to load 22 using working cells 50–52.

Switching device 42 is configured in some modes of operation to selectively electrically insulate at least one of working cells 50–52 from anodic and cathodic terminals 32, 33 and the other working cells. According to a preferred embodiment, switching device 42 is configured to selectively replace or exchange one or more of working cells 50–52 with spare cell or cells 44. Such replacing or exchanging of working cells 50–52 with spare cell 44 can be responsive to monitoring of working cells 50–52 and/or spare cell 44. Typically, such replacement of one or more working cells 50–52 occurs when the replaced cell(s) is in a deficient electrical condition (e.g., insufficient voltage potential, shorted condition upon leads of the cell, etc.).

Switching device 42 is also configured to selectively couple spare cell 44 in series with one or more working cells 50–52, and terminals 30–33 in the preferred embodiment. As illustrated, working cells 50–52 are coupled in series with anodic and cathodic terminals 32, 33. According to one embodiment and responsive to a deficient collective electrical condition across working cells 50–52 and terminals 32, 33, spare cell 44 can be added or included in series with working cells 50–52 to offset the deficient collective electrical condition.

In particular, controller 46 is preferably configured to monitor a collective electrical condition of working cells 50–52 (i.e., electrical condition of battery 40). Responsive to such collective monitoring, controller 46 can be configured to selectively electrically couple spare cell 44 in series with terminals 32, 33 and working cells 50–52 using switching device 42. Thereafter, working cells 50–52 are configured to supply electricity in series with spare cell 44 to terminals 30, 31 and load 22. Such a configuration is advantageous during extended usages of battery 40 or periods of extreme current draw upon battery 40.

In one embodiment, switching device 42 is configured to continuously rotate spare cell 44 into the working set of cells 50–52. In particular, individual working cells 50–52 are sequentially replaced with a current spare cell 44. A replaced working cell 50–52 becomes a new spare cell which can be tested, analyzed and charged/discharged.

The illustrated switching device 42 of FIG. 5 is simplified. In one embodiment, switching device 42 includes a plurality of switches and connections coupled with working cells 50–52 and spare cell 44. The switches and connections can be utilized to exchange a chosen working cell or cells 50–52 with spare cell or cells 44. Connections and switches of device 42 can be further utilized to couple spare cell 44 in series with working cells 50–52 intermediate terminals 30, 31 in a preferred embodiment.

Referring to FIG. 6, an exemplary switching device 42 is illustrated. The depicted switching device 42 comprises a mechanical rotary switch 43 configured to exchange or replace at least one of a plurality of working cells with a spare cell. Switch 43 can comprise a semiconductor, relay or other switch configuration in another embodiment. Plural spare cells can be utilized in other embodiments. The depicted rotary switch 43 is arranged to provide periodic stepped rotation of the spare cell among the working set of cells of the battery system according to one embodiment of the invention.

In particular, such rotation includes sequentially replacing one or more working cells with the spare cell. The replaced working cell(s) becomes the new spare cell. The new spare cell can be monitored, tested, etc. as described previously. Thereafter, the new spare cell can be switched with another working cell wherein the spare cell replaces the working cell in the working set and the newly replaced working cell becomes the new spare cell. Such enables individual monitoring of the working cells of battery system 20.

The illustrated switch 43 is coupled with a load (not illustrated in FIG. 6) via anodic terminal 32 and cathodic terminal 33. Further, the depicted switch 43 is configured to couple with test/charge circuit 49 via an anodic terminal 64 and cathodic terminal 65 enabling monitoring and charging/discharging of the spare cell.

The depicted switching device 42 includes plural rotary switches 68, 69. Rotary switches 68, 69 comprise five pole/five position rotary switches in the depicted embodiment. Plural cells 70–74 are shown in FIG. 6 coupled with switches 68, 69. Cells 70–74 individually include an anodic connection coupled with switch 68 and a cathodic connection coupled with switch 69.

In the illustrated embodiment, one spare cell and four working cells are illustrated. Switches 68, 69 operate to select the spare cell and working cells. Switching device 42 operates to rotate the selection of a spare cell among depicted cells 70–74 in one embodiment. In the depicted position of switches 68, 69, cell 74 comprises the spare cell and cells 70–73 comprise working cells.

Individual rotary switches 68, 69 comprise respective inner hubs 76, 77 and respective outer hubs 78, 79. Inner hubs 76, 77 include respective inner nodes 81, 82 (plural inner nodes 81, 82 are provided in the depicted embodiment although only single nodes 81, 82 are labeled as such in FIG. 6). Outer hubs 78, 79 include respective outer nodes 84, 85 (plural outer nodes 84, 85 are also provided in the depicted embodiment although only single nodes 84, 85 are labeled in FIG. 6).

Referring to switch 68, inner nodes 81 are radially coupled with adjacent outer nodes 84 via respective electrical connections 86. With respect to rotary switch 69, inner nodes 82 are radially coupled with adjacent outer nodes 85 via respective electrical connections 87.

As previously mentioned, cell 74 comprises the spare cell and cells 70–73 comprise working cells in the depicted position of rotary switches 68, 69. In particular, an anodic connection of cell 74 is coupled with anodic terminal 64 via nodes 81, 84 of inner hub 76 and outer hub 78, respectively. In addition, the cathodic connection of cell 74 is coupled with cathodic terminal 65 via nodes 82, 85 of respective inner hub 77 and outer hub 79. Cell 74 can be charged, discharged and/or tested during the orientation of switches 68, 69 shown in FIG. 6.

Further, cells 70–73 comprise working cells which are coupled in series intermediate anodic terminal 32 and cathodic terminal 33 corresponding to rotary switches 68, 69 being positioned as shown in FIG. 6. More specifically, an anodic connection of cell 70 is coupled with anodic terminal 32 via switch 68. A cathodic connection of cell 70 is coupled with an anodic connection of cell 71 via switches 68, 69 and an interconnection 59. A cathodic connection of cell 71 is coupled with an anodic connection of cell 72 via switches 68, 69 and an interconnection 60. A cathodic connection of cell 72 is coupled with an anodic connection of cell 73 via switches 68, 69 and an interconnection 61. The cathodic connection of cell 73 is coupled with cathodic terminal 33 via switch 69.

Responsive to control signals from the controller, rotary switches 68, 69 are configured to sequentially rotate the spare cell among cells 70–74 in one embodiment. Alternatively, switches 68, 69 can be oriented to provide a desired cell 70–74 as the spare cell. In the depicted embodiment, either inner hubs 76, 77 or outer hubs 78, 79 are configured to rotate to provide the rotation of the spare cell among cells 70–74. Both inner hubs 76, 77 and outer hubs 78, 79 are configured to rotate in an alternative embodiment.

For example, clockwise rotation of one node (i.e., clockwise rotation of 72°) of outer hub 78 and counterclockwise rotation of one node of outer hub 79 results in cell 70 being the spare cell and cells 71–74 being working cells. Another clockwise rotation of one node of outer hub 78 and counterclockwise rotation of one node of outer hub 79 results in cell 71 being the spare cell and cells 70, 72–74 being working cells. Additional subsequent clockwise rotation of outer hub 78 and counterclockwise rotation of outer hub 79 results in cells 72, 73 being individually coupled with terminals 64, 65 and configured as the spare cell. Inner hubs 76, 77 can also be configured to rotate with respect to outer hubs 78, 79 to change the selection of the spare cell among cells 70–74. In a preferred embodiment, rotation of hubs 78, 79 or hubs 76, 77 occurs simultaneously.

Once a cell 70–74 is connected to terminals 64, 65 as the spare cell, it can be tested (fully discharged under load), recharged and/or equalized without interrupting the on-line battery system comprising the working cells. Switches 68, 69 can be positioned to replace a given working cell with the spare cell responsive to identification of the working cell being in a deficient electrical state. For example, if cell 72 is identified as deficient, switches 68, 69 can be configured to selectively and immediately connect cell 72 as the spare cell without regard to which cell 70–74 is currently the spare cell.

Referring to FIG. 7, switching device 42 is configured to exchange a working cell with a spare cell and also provide serial coupling of a spare cell with the working cells responsive to control signals from controller 46.

More specifically, as a battery supplies its stored energy, the voltage of the working set of cells drops. The working set of cells is therefore typically sized to supply a desired amount of energy before the voltage drops to a level where the load can no longer function. The present invention enables a working set of cells to be sized smaller than the full energy needs dictate by providing a spare cell which is configured to be added as part of the working set.

Advantages of this aspect of the invention are realized when the working set is and/or has been under load. According to one embodiment, battery system 20 can be configured such that the spare cell is added to the working set of cells in series to boost the working voltage and extend the service time of the battery to the load when the working voltage drops by the approximate voltage of the spare cell. Using the spare cell in this disclosed manner provides an opportunity to size the working set of cells smaller by the amount of redundancy provided.

The depicted switching device 42 includes rotary switch configuration 43 described in detail with reference to FIG. 6, and a serial switch arrangement 45. Rotary switch 43 chooses at least one spare cell from the available cells as described above. The chosen spare cell is coupled with anodic terminal 64 and cathodic terminal 65. The serially coupled cells comprising the working set are coupled with anodic terminal 32 and cathodic terminal 33. Cells 70–74 are not shown in FIG. 7.

Serial switch 45 is configured to selectively couple the spare cell in series with the working set of cells. Serial switch 45 comprises switch components 88, 89 which individually include connections A, B. Switches 88, 89 can be controlled responsive to signals from controller 46 according to the described embodiment.

Anodic terminal 32 coupled with the working set of cells is coupled with anodic terminal 30 of battery system 20. Cathodic terminal 33 also coupled with the working set of cells is coupled with connection A of switch 88.

Anodic terminal 64 of the spare cell is coupled with connection B of switch 89. Cathodic terminal 65 of the spare cell is coupled with connection B of switch 88.

Cathodic terminal 31 of battery system 20 is switched between connections A and B of switch 88. Cathodic terminal 33 is selectively coupled with connections A and B of switch 89. Connection A of switch 89 preferably comprises an open connection.

Responsive to switches 88, 89 being in the "A" position, the working cells are serially coupled intermediate battery system terminals 30, 31. Spare cell 64 is not coupled with terminals 30, 31 during configuration of switches 88, 89 in the "A" position. Provision of switches 88, 89 in the "B" position couples the spare cell in series with the working cells intermediate terminals 30, 31 of battery system 20. Control signals from controller 46 operate switches 88, 89 intermediate the "A" and "B" positions. In the preferred embodiment, switches 88, 89 are both simultaneously provided in either the "A" position or the "B" position.

One advantage of the redundant battery back-up system of the present invention includes increased efficiency. The disclosed battery system utilizes a small percentage of redundancy to provide a redundant back-up system. In particular, redundancy can be provided with fewer cells. Further, redundancy can be maintained during full discharges under load, and recharge cycles.

Battery testing of the working and spare cells provides the system with improved capacity information to enable predictive failure information and allow for preventative maintenance before a back-up power situation arises. In a preferred embodiment, the working and spare cells or cell packs are field replaceable units (FRUs) which comprise smaller units than an entire battery set. Such cells or cell packs are preferably easily replaceable during servicing or maintenance.

A minimum percentage of redundancy can be determined by the configuration and granularity of cells available in a given battery technology. However, the cost, size and amount of harmful components are reduced through the utilization of fewer redundant cells in accordance with the present invention.

Smaller charging circuits can be utilized to charge batteries and battery systems of the present invention inasmuch as fewer cells are provided. The full working set of cells and spare cell or cells may be separately maintained with respective float charges to assure peak battery performance over extended periods of time. In addition, working cells and the spare cell or cells can be monitored, analyzed and/or tested without impacting the availability of the working set of cells.

According to conventional dual battery devices, a configuration having six cells for the working battery would also have six cells for the spare battery providing a total of twelve cells. The present invention enables use of one spare cell in addition to six working cells for a total of seven cells. Providing a single spare cell in such a configuration provides 16.7% redundancy.

In another example, four working cell packs and one spare cell pack are provided. The working and spare cell packs individually comprise six individual cells. The cell packs individually provide twelve Volts DC if individual cells provide two Volts DC. The four cell packs can be coupled in series to form a battery or working set which provides higher voltages (e.g., forty-eight Volts DC). The battery is typically designed to meet load demands (e.g., amp-hours) of the system where it is applied.

A spare cell pack can be provided which includes six two Volt DC cells coupled in series. In a typical discharge application, the associated load system requires four cell packs to be "on-line" or available within the working set. The spare cell is preferably kept in reserve, tested and fully charged until it is needed.

The following illustrates exemplary failures within a working set of cells and operation of the battery system of the present invention responsive thereto. One problem is a cell pack of the working set opens thereby opening the battery system. Consequently, the open-circuit voltage of the battery system falls to zero and no current can be supplied to the load. The controller of the battery system according to the present invention is configured in a preferred embodiment to sense zero volts across the failed working cell set and switch the spare cell set in place of the failed cell set to resume battery system function. Thereafter, the failed cell set becomes the spare cell set and can be tested, monitored and replaced if needed.

Another exemplary failure includes a situation wherein a working cell pack shorts. In this condition, the battery system open-circuit voltage is approximately 36 Volts (as opposed to the desired 48 Volts discussed earlier). The controller is preferably configured to sense zero volts across the failed working cell pack and switch the spare cell pack in place of the failed cell pack to resume battery function. Again, the failed working cell pack can be tested, monitored and replaced if needed.

Another possible condition includes the failure of two cells within a single working cell pack. In this situation, the battery system open-circuit voltage is approximately 44 Volts instead of 48 Volts. The controller can be configured to sense a discrepancy in voltage (i.e., 8 Volts instead of 12 Volts) across the failed working cell pack. Thereafter, the controller is preferably configured to switch the spare cell pack in place of the failed cell pack to resume battery function.

As described above, the controller is also preferably configured to couple the spare cell pack in series with the working cell packs. For example, if the current demand becomes excessive either in rate or duration, working cell voltages will drop and the battery system voltage may also drop. The controller can be configured to sense a low voltage within the system (e.g., approximately 40 Volts) and add the spare cell pack in series with the working cell packs to boost the voltage of the battery system for continued discharge.

Another failure condition can involve the presence of undetected weak cells within the working cell packs of the battery system. As a result, the battery system voltage may drop prematurely under load in a back-up situation. The controller is preferably configured to sense the low voltage of the battery system and add the spare cell pack in series to boost the voltage of the battery system for continued discharge.

As opposed to the one hundred percent redundant conventional dual battery systems, the exemplary battery system previously described (made of five cell packs) has 25% redundancy. Two spare cell packs would yield 50% redundancy (50% less than a dual battery system). Such a configuration could allow full discharge of one spare cell and still retain 25% redundancy for the battery system. In a configuration having plural spare cells, a failed spare could be replaced while retaining a portion of the designed redundancy.

The concept of the present invention can be extended to having one or two spare cells for an entire battery system made of twenty-four (or more) individual cells. If the 48 V battery system example uses Ni-Cad cells instead of lead-acid, roughly twice the number of cells would be utilized. The number of sensors and switches utilized within the battery system would increase as the granularity increases.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A battery system comprising:
   a first terminal adapted to be electrically coupled to a load;
   a second terminal substantially electrically insulated from the first terminal:
   a battery including a plurality of working cells electrically coupled with the first terminal;
   a spare cell electrically coupled with the second terminal; and
   a switching device configured to selectively switch the spare cell and a selected one of the working cells to couple the spare cell with the first terminal and to couple the selected working cell with the second terminal.

2. The battery system according to claim 1 wherein the switching device is configured to selectively electrically couple the first terminal and the second terminal.

3. The battery system according to claim 1 wherein the working cells are coupled in series with the first terminal.

4. The battery system according to claim 1 wherein the battery system comprises a redundant back-up battery system.

5. The battery system according to claim 1 further comprising a controller configured to monitor at least one of the working cells and control the switching device.

6. A battery system comprising:
   a terminal adapted to be electrically coupled to a load;
   a battery including a plurality of working cells electrically coupled with the terminal;
   a spare cell having a voltage potential less than a voltage potential of the battery; and
   a switching device configured to selectively electrically couple the spare cell with the terminal and arrange at least some of the working cells and the spare cell to provide electrical energy to the terminal.

7. A method of supplying electrical energy comprising:
   providing a plurality of working cells and a spare cell;
   electrically coupling a plurality of working cells with a first terminal adapted to be coupled to a load;
   electrically coupling the spare cell with a second terminal substantially electrically insulated from the first terminal; and
   switching the couplings of the spare cell and one of the working cells.

8. The method according to claim 7 further comprising switching the couplings of the spare cell and another of the working cells.

9. The method according to claim 7 further comprising selectively electrically coupling the spare cell in series with the working cells.

10. The method according to claim 7 further comprising monitoring the working cells and the switching is responsive to the monitoring.

11. The method according to claim 7 further comprising at least one of charging, testing and discharging the spare cell.

12. The method according to claim 7 further comprising at least one of the charging, testing and discharging the spare cell while supplying electrical energy to the first terminal using the working cells.

13. The method according to claim 7 further comprising:
    charging the spare cell; and
    charging the working cells in series.

14. The method according to claim 7 further comprising supplying electrical energy using at least some of the working cells and the spare cell.

15. A method of supplying electrical energy to a load using a redundant battery back-up system comprising:
    providing a plurality of working cells and a spare cell;
    providing a plurality of terminals having opposite electrical polarity;
    electrically coupling a plurality of working cells in series intermediate the terminals;
    selectively supplying electrical energy to at least one of the terminals using the working cells;
    first monitoring an electrical condition of individual ones of the working cells;
    selectively exchanging one of the working cells with the spare cell responsive to the first monitoring;
    supplying electrical energy to at least one of the terminals using the spare cell following the exchanging;
    second monitoring a collective electrical condition of the working cells;
    selectively electrically coupling the spare cell in series with the terminals and the working cells responsive to the second monitoring; and
    supplying electrical energy to at least one of the terminals using the spare cell and the working cells following the coupling of the spare cell.

* * * * *